(12) United States Patent
Kojima et al.

(10) Patent No.: US 9,462,854 B2
(45) Date of Patent: Oct. 11, 2016

(54) FASTENER STRINGER

(75) Inventors: Masayoshi Kojima, Toyama (JP); Aya Shigematsu, Toyama (JP)

(73) Assignee: YKK Corporation (JP)

( * ) Notice: Subject to any disclaimer, the term of this patent is extended or adjusted under 35 U.S.C. 154(b) by 124 days.

(21) Appl. No.: 14/349,786

(22) PCT Filed: Oct. 7, 2011

(86) PCT No.: PCT/JP2011/073200
§ 371 (c)(1),
(2), (4) Date: Apr. 4, 2014

(87) PCT Pub. No.: WO2013/051149
PCT Pub. Date: Apr. 11, 2013

(65) Prior Publication Data
US 2015/0033512 A1    Feb. 5, 2015

(51) Int. Cl.
| A44B 19/26 | (2006.01) |
| A44B 19/40 | (2006.01) |
| A44B 19/06 | (2006.01) |
| B29D 5/02 | (2006.01) |
| A44B 19/44 | (2006.01) |

(52) U.S. Cl.
CPC ............ *A44B 19/403* (2013.01); *A44B 19/06* (2013.01); *A44B 19/26* (2013.01); *A44B 19/44* (2013.01); *B29D 5/02* (2013.01); *Y10T 24/2588* (2015.01)

(58) Field of Classification Search
CPC .... A44B 19/403; A44B 19/06; A44B 19/26; A44B 19/44; Y10T 24/2588; B29D 5/02
See application file for complete search history.

(56) References Cited

U.S. PATENT DOCUMENTS

| 3,055,069 A | 9/1962 | Morin | |
| 3,238,285 A * | 3/1966 | Morin | A44B 19/04 24/410 |
| 4,520,535 A * | 6/1985 | Kasai | A44B 19/06 24/410 |
| 8,539,650 B2 * | 9/2013 | Kojima | A44B 19/00 24/410 |
| 2011/0265291 A1* | 11/2011 | Kojima | A44B 19/00 24/406 |

FOREIGN PATENT DOCUMENTS

| JP | 2007-021023 A | 2/2007 | |
| JP | WO 2010082294 A1 * | 7/2010 | ............ A44B 19/00 |
| JP | D1408991 | 3/2011 | |
| JP | D1382201 | 3/2013 | |
| WO | 2010/082294 A1 | 7/2010 | |

OTHER PUBLICATIONS

International Search Report, PCT Application No. PCT/JP2011/073200 mailed Dec. 20, 2011.

* cited by examiner

*Primary Examiner* — Robert J Sandy
*Assistant Examiner* — Matthew Sullivan
(74) *Attorney, Agent, or Firm* — Kilpatrick Townsend & Stockton LLP

(57) ABSTRACT

A fastener stringer is provided with a fixing section in which at least one of a first and second half sections is fixed to a fastener tape and a tapered extending section which extends from the fixing section toward the outside of the tape. A first side face and a second side face in the tape length direction in the fixing section have concave surfaces which curve in a concave shape so as to gradually increase from an element surface of a fastener element toward the fastener tape. Accordingly, each fastener element can exhibit an appearance close to a metallic fastener element and a locking mechanism of a slider can be made to function stably.

7 Claims, 10 Drawing Sheets

FASTENER STRINGER

This application is a national stage application of PCT/JP2011/073200, which is incorporated herein by reference.

TECHNICAL FIELD

The invention relates to a fastener stringer in which a plurality of fastener elements made of synthetic resin are arranged by injection molding in a tape side edge section of a fastener tape. In particular, the invention relates to a fastener stringer in which each fastener element made of synthetic resin has an appearance like a metallic fastener element.

BACKGROUND ART

As a fastener element which is conventionally used for a slide fastener, a fastener element made of synthetic resin which are formed individually by injection-molding synthetic resin onto a fastener tape, a continuous fastener element which is formed by molding a mono-filament in a coiled shape or a zigzag shape, and a metallic fastener element which is formed by caulking an approximately Y-shaped metallic element material onto a fastener tape, and the like are known.

Further, in general, the fastener element made of synthetic resin is directly fixed to the fastener tape when injection molding. Therefore, by broadening a fixing area of the fastener element with respect to the fastener tape, fixing strength of the fastener element with respect to the fastener tape can be enhanced. For this reason, in a conventional fastener element made of synthetic resin, an element width dimension of each fastener element is set-large in order to ensure the fixing strength of the fastener element stably.

Whereas, since the metallic fastener element is attached to the fastener tape, for example by caulking an element which has an approximately-Y-shaped cross section, the metallic fastener element can easily obtain enough fixing strength without setting the element width dimension as large as in the fastener element made of synthetic resin as described above.

Generally, the fastener element, made of synthetic resin is molded so as to extend between a first surface, which becomes to be an outer surface of the fastener tape, and a second surface, which becomes to be a tape back face of the fastener tape, and the fastener element made of synthetic resin has a first half section which is disposed, on the first surface side of the fastener tape and a second half section which is disposed, on the second surface side of this fastener tape.

Further, such a fastener element made of synthetic resin is often avoided such that the first half section and the second half section have symmetrical shapes. However, for example, in order to enhance appearance quality (sense of beauty) of the fastener tape or in order to improve touch (texture) of the fastener element, the first half section and the second half section may be formed to be in a different and asymmetrical shape.

For example, WO 2010-082294 A (Patent Document 1) and Design Registration No. 1382201 (Patent Document 2) disclose fastener stringers in which the first half section of the fastener element has an appearance like a metallic fastener element.

For example, a fastener element 60 described in the Patent Document 1 is fixed to a tape side edge section of a fastener tape 65 by injection-molding thermoplastic resin, and as shown in FIGS. 18 and 19, a fastener element 60 comprises a first half section 61 disposed on a tape upper face side of the fastener tape 65 and a second half section 62 disposed on a tape lower face side and integrally formed with the first half section 61. Further, here, a vertical direction refers to a tape front and back direction which is orthogonal to a tape surface of the fastener tape 65. Also, a back and forth direction refers to a length direction of the fastener tape 65, and a horizontal direction refers to a tape width direction of the fastener tape 65.

In this fastener element 60, the first half section 61 includes a fixing section 61a which is fixed to the fastener tape 65, and an extending section 61b which extends from the fixing section 61a toward the outside of the tape. The extending section 61b has a tapering shape in which an element width dimension in the tape length direction gradually decreases toward a tip end section of the extending section 61b.

In the first half section 61, in order to ensure the fixing strength with the fastener tape 65, the element width dimension in the lower end section (an end section on the side which is in contact with the fastener tape 65) of the fixing section 61a has a predetermined size.

Further, as shown in FIG. 19, the front side face and the back side face of the fixing section 61a in the first half section 61 is formed on a convex surface 63, which curves outwards in a convex shape such that the element width dimension of the first half section 61 gradually decreases from a tape surface of the fastener tape 65 toward an upper face of the fastener element 60. Accordingly, the first half section 61 is composed such that the element upper face, which is exposed to the outside directly, appears to be thin. Additionally, in the first half section 61, an interference avoidance section 61c, which inclines downward so as to gradually decrease a height dimension in the vertical direction of the fastener element 60 toward the tip end section of the extending section 61b, is formed.

The second half section 62 includes a body section 62a which is fixed to the fastener tape 65, a neck section 62b which extends from the body section 62a toward the outside of the tape and which is constricted so as to decrease the dimension in the element width direction, and a coupling head section 62c which extends further from the neck section 62b toward the outside of the tape. Therefore, each fastener element 60 in Patent Document 1 is coupled with a fastener element 60 of an engaging counterpart on the side of the second half section 62.

Since such a fastener element 60 in Patent Document 1 is composed of synthetic resin, it is light in weight compared to a metallic fastener element. Additionally, the fastener element 60 is formed so as to appear thinner than a conventional fastener element made of synthetic resin, while ensuring fixing strength with the fastener tape 65, so that the fastener element 60 has an appearance (show) like a metallic fastener element.

Therefore, a slide fastener, to which the fastener elements 60 in the Patent Document 1 are attached, looks stylish or adds a fashionable impression and at the same time is significantly reduced in weight, compared to a metal slide fastener and is formed.

Since the slide fastener, to which the fastener elements 60 in Patent Document 1 are attached, is provided with an interference avoidance section 61c as described above in each fastener element 60, for example in a case that the fastener elements 60, which is in a state that the left and right fastener elements 60 are coupled with each other, receives force in the tape front and back direction (push-up force) and a part of the slide fastener is bent in the direction in which the respective upper half sections of the elements are brought close to each other, it is possible to avoid interference between the first half section 61 of the fastener element 60 and the first half section 61 of a fastener element 60 on the side of an engaging counterpart.

Thus, even if the slide fastener receives push-up force, it is prevented to easily decouple the engagement between left and right fastener elements 60, and the coupled state can be stably maintained. Accordingly, in the slide fastener, it is possible to prevent causing so-called chain split in which engagement of fastener elements 60 are forcibly decoupled.

On the other hand, in Patent Document 2, a fastener chain, in which fastener elements having substantially the same shape as those in Patent Document 1 are attached to a fastener tape, is illustrated.

Additionally, for example, in Design Registration No. 1408991 (Patent Document 3), a fastener chain which design is further improved by providing more irregularities on an upper face of the fastener elements illustrated in Patent Document 2, is illustrated.

CITATION LIST

Parent Documents

Patent Document 1: WO 2010-082294 A
Patent Document 2: Design Registration No. 1382201
Patent Document 3: Design Registration No. 1408991

SUMMARY OF THE INVENTION

Problems to be Solved by the Invention

The fastener elements shown in Patent Documents 1 to 3 can be composed so as to be similar to a metal slide fastener and so as to achieve light weight compared to a metal slide fastener by showing the fastener elements shown in Patent Documents 1 to 3 like metallic fastener elements as described above.

However, although the appearance of these fastener elements is similar to that of metallic fastener elements, they are different from metallic fastener elements when they are compared with metallic fastener elements. Therefore, it is required to make an appearance of fastener elements made of synthetic resin further closer to metallic fastener elements while ensuring fixing strength of the fastener elements.

As a conventional slider used for a slide fastener, a slider with a locking mechanism is known. Generally, a slider with a locking mechanism has a locking pawl which is engaged with fastener elements. The locking pawl is inserted in a gap between fastener elements adjacent to each other and engaged with the fastener elements, and thereby the slider is locked with respect to element, rows and a locked state of the slider can be maintained.

A slider with such a locking mechanism can also be used for, for example, a slide fastener to which fastener elements 60 in Patent Documents 1 to 3 are attached. For example, the locking mechanism can be worked by engaging the locking pawl of the slider with the fixing section 61a of the first half section 61 in the fastener element 60.

However, in the fastener elements 6D in Patent Documents 1 to 3, for example as shown in FIG. 19, the front side face and the back side face of the fixing section 61a in the fastener element 60 are formed on a convex surface 63 which curves outward in a convex shape.

Therefore, even if the locking pawl of the slider is inserted into a gap between the fastener elements 60 and engaged with the front side face or the back side face of the fastener elements 60, the engagement of the locking pawl with respect to the fastener elements 60 is likely to become unstable, for example in a case that the locking pawl is formed to be thick.

Additionally, if a slider is subjected to some impact or the like, its locking pawl may be slid and lifted up on the front side face or the back side face of the fastener element 60. Consequently, the locked state of the slider by the locking mechanism is released automatically regardless of the intention of a user, and the locked state of the slider cannot be stably held, so that there is room for improvement.

Furthermore, in the fastener elements described in Patent Documents 1 to 3, a shape of the first half section which is formed on the tape upper face side and a shape of the second half section which is formed on the tape lower face side differ from each other.

Therefore, for example, in a slide fastener having a separable bottom end stop, in a case that a so-called slide fastener for right-side insertion, in which an insert pin is inserted into a box from the right side of a box pin, and a so-called slide fastener for left-side insertion, in which the insert pin is inserted into the box from the left side of the box pin, are manufactured, dedicated dies for right-side insertion and for left-side insertion are required, respectively, since in molding dies for the fastener element and the separable bottom end stop, the shape of a cavity space for the slide fastener for right-side insertion and for the slide fastener for left-side insertion is different. This is one of the factors causing manufacturing cost increase of the slide fastener.

The invention has been proposed in view of the conventional problems described above. The specific object of the invention is to provide a fastener stringer having fastener elements which are lighter in weight than metallic fastener elements and which have an appearance close to metallic fastener elements, additionally, in which a locking mechanism can be worked stably, even in a case that a slider comprises a locking mechanism using a locking pawl.

Means for Solving the Problems

In order to achieve the above object, a fastener stringer provided by the invention includes a fastener tape and a plurality of fastener elements made of synthetic resin which are attached to a tape side edge section of the fastener tape as a basic configuration, in which the fastener element includes a first half section which are disposed on a first surface side of the fastener tape and a second half section which are disposed on a second surface side of the fastener tape, and in which at least one of the first and the second half sections has a tapered element shape comprising a fixing section fixed to the fastener-tape and an extending section extending from the fixing section toward the outside of the tape and gradually decreasing element width dimension in the tape length direction toward a tip end section, and the fastener stringer being most mainly characterized in that a width dimension from a first side face to a second side face in a tape length direction in the fixing section gradually increases from an element surface of the fastener element toward a tape surface of the fastener tape, and in that each of the first side face and the second side face in the fixing section has a concave surface, which curves in a concave shape from the element surface toward a tape surface of the fastener tape.

In the fastener stringer according to the invention, it is preferable that a width dimension from a first side face to a second side face in a tape length direction in the extending section gradually increases from an element surface of the fastener element toward a tape surface of the fastener tape, and each of the first side face and the second side surface in the extending section has a concave surface, which curves in a concave shape from the element-surface toward a tape surface of the fastener tape.

In this case, it is particularly preferable that the concave surface be continuously disposed from the fixing section over the extending section which are in the tapered element shape.

Further, in the fastener stringer according to the invention, it is preferable that the other of the first and the second half sections has the tapered element shape which has a plane-symmetrical relation with respect to the one of the first and the second half sections as well as the fastener tape, and that a coupling head section, which is capable of coupling with the fastener element of a counterpart, and a neck section, which is continuously formed from the coupling head section and which has a shape in which a dimension of an element width direction decreases, are disposed between the respective extending sections of the first and the second half sections in a tape front and back direction.

On the other hand, the other of the first and the second half sections may include a coupling head section which is disposed on a back face side of the extending section in one of the first and the second half sections and which is able to couple with a fastener element of a counterpart, a neck section which is continuously formed from the coupling head section and which has a shape in which a dimension of an element width direction decreases, and a body section which is continuously formed from the neck section and which is fixed to the fastener tape.

Additionally, in the fastener stringer according to the invention, it is preferable that metal fine pieces made of aluminum or aluminum alloy be kneaded in the synthetic resin.

Further, in this case, it is particularly preferable that an average particle diameter of the metal fine pieces is set to be $\geq 3$ μm$\leq 8$ μm.

Advantageous Effects of Invention

In the fastener stringer according to the invention, at least one of a first find a second half sections has a tapered element shape comprising a fixing section fixed to the fastener tape and an extending section extending from the fixing section toward the outside of the tape and gradually decreasing element width dimension of cape length direction toward a tip end section.

Further, the width dimension from the first side face (front side face) to the second side face (back, side face) in the tape length direction in the fixing section which has a tapered element shape, gradually increases from the element surface of the fastener element toward the tape surface of the fastener tape. Additionally, at least a part of each of the first side face and the second side surface in the fixing section has a concave surface, which curves in a concave shape from the element surface toward the tape surface of the fastener tape.

For example, in the conventional fastener element described in Patent Document 1, since the front side face and the back side surface in the fixing section of the first half section are formed on a convex surface which curves outward in convex shape, light is diffused and reflected on the front side face and the back side surface and scattered toward the outside (particularly in an upper side of the fastener element). For this reason, when the fastener element is viewed from the upper face side, the front side face and the back side surface in the fixing section also appear bright, such that the first half section of the fastener element appears thick in the element width direction, compared to the area of the upper face of the first half section, and consequently tends to exhibit a different appearance from the metallic fastener element.

Meanwhile, in a fastener element in the invention, the first and the second side surfaces (front and back side surfaces) in the fixing section, which is in a tapered element form, have concave surfaces, as described above. Therefore, when the fastener element is viewed from an upper face side, the first and the second side surfaces become hard to be seen compared to a conventional fastener element in which the first and the second side surfaces are formed on a convex surface.

Since a concave surface is formed on the first and second side faces, reflecting light on the first and second side faces, in particular, reflecting light on the first and the second side faces near an upper face side of the fixing section becomes hard to scatter toward an upper side of the fastener element, so that a visual effect that the first and the second side faces become to be shadow sections and appear dark, can be obtained.

As a result, in the fastener element according to the invention, the fixing section becomes to appear to be narrow in the element width direction and becomes to appear to be thin in the element length direction, compared to a conventional fastener element in which the first and the second side faces are formed on a convex surface, so that it is possible to exhibit an appearance (show) close to a metallic fastener element.

Therefore, since the fastener stringer according to the invention, in which such fastener elements are attached to the fastener tape, is lighter in weight than metallic fastener elements and has an appearance close to metallic fastener elements rather than conventional fastener elements made of synthetic resin, so that these fastener stringers are suitably used for, for example, bags, clothes or the like which are designed to have a high-grade sense.

Additionally, in a case that a slide fastener is composed using fastener stringers according to the invention and a slider provided with a locking mechanism by a locking pawl, the locking mechanism of the slider can be performed smoothly by engaging the locking pawl of the slider with the fixing section of the first half section of the fastener element (in particular, the first or second side of the fixing section) in the slide fastener.

In this case, since a concave surface is disposed on the first and the second side faces in the fixing section of the fastener element of the invention, for example, even in a case that the locking pawl of the slider is formed to be thick, when the locking pawl is engaged with the first or the second side face of the fixing section of the fastener element, the locking pawl of the slider is received and accommodated securely by the concave surface of the first or the second side face, so that it is possible that the locking pawl is hardly disengaged.

Accordingly, even in a case that the slider is subjected to some impact or the like, a state that the locking pawl of the slider is engaged with the front side face or the back side face of the fixing section of a fastener element can be stably held, thus it is possible to effectively avoid occurring malfunction that a locked state of the slider is released automatically as before.

In such a fastener stringer according to the invention, the width dimension from the first side face to the second side face in the tape length direction in the extending section also gradually increases from the element, surface of the fastener element toward the tape surface of the fastener tape. Also, at least a part of the first side face and the second side face in the extending section has a concave surface which curves in a concave shape from, the element surface toward the tape surface of the fastener tape. Thus, not only the fixing section but also the extending section becomes narrow in the element width direction and becomes to appear to be thin, so that it is possible to exhibit an appearance further close to the metallic fastener element.

Particularly in this case, since the concave surface which curves in a concave shape is continuously disposed from the fixing section to the extending section which are in a tapered element shape, it is possible to exhibit an appearance even closer to the metallic fastener element.

Further, in the fastener stringer according to the invention, it is possible to configure the fastener element, to have a tapered element shape in which the other of the first and the second half sections has a plane-symmetrical relation with respect to the one of the first and the second half sections as well as the fastener tape. In this case, a coupling head section which is capable of engaging a fastener element of a counterpart and a neck section which is continuously formed from the coupling head section and which has a shape in which a dimension of element width direction tapers off, are disposed between the respective extending sections of the first and the second half sections in a tape front and back direction.

Since in such a fastener element which has the above form, the first half section and the second half section have a plane-symmetrical shape with respect to the fastener tape, it is possible to configure the slide fastener so as to expose the first surface side of the fastener tape to the outside and to configure the slide fastener so as to expose the second surface side of the fastener tape to the outside.

Accordingly, the fastener stringer according to the invention can easily be used for the slide fastener for right-side insertion or the slide fastener for left-side insertion by using them turned back, to front. As a result, it is unnecessary to manufacture respective dedicated dies for right-side insertion and for left-side insertion as molding dies for the fastener element and the separable bottom end stop. Therefore, the manufacturing cost reduction of the slide fastener can be achieved.

Additionally, in the fastener stringer according to the invention, it is also possible to configure a fastener element which includes a coupling head section in which the other of the first and the second half sections is disposed on the back face side of the extending section in one of the first, and the second half sections and which is capable of engaging with a fastener element of a counterpart, a neck section which is continuously formed from the coupling head section and which has a shape in which a dimension of the element width direction decreases, and a body section which is continuously formed from the neck section and which is fixed to the fastener tape.

Since such a fastener element has an asymmetrical shape in which the first and the second half sections are different each other, it is possible to exhibit an appearance close to the metallic fastener element by one of the first and second half sections, and it is possible to stably engage left and right fastener elements when a slide fastener is configured by the other of the first and the second half sections.

Furthermore, in the fastener stringer according to the invention, metal fine pieces made of aluminum or aluminum alloy are kneaded in synthetic resin which composes the fastener element. Therefore, the fastener element according to the invention has an advantage that it is less expensive and lighter in weight than the metallic fastener element. Also, the gloss with high-grade sense can be obtained over the entire fastener element.

Particularly in this case, when the fastener element, is viewed from its upper face side, since the contrast between an upper face which is easy to see reflection of light, and the first and second side faces which are difficult to see reflection of light is remarkably appeared, an appearance of the fastener element can be made further close to the metallic fastener element. Furthermore, it is possible to obtain an effect that the strength of the fastener element can easily be enhanced by kneading the metal fine pieces.

In this case, since the average particle diameter of the metal fine pieces is set to be $\geq 3$ μm$\leq 8$ μm, it is possible to stably obtain the gloss of the fastener element by the metal fine pieces, and the flow of molten resin in the cavity of the mold is prevented from becoming worse when performing injection molding of the fastener element and generation of a weld mark which causes a fault of molding is prevented, and thus it is possible to stably form the fastener element in a required shape.

MODES FOR CARRYING OUT THE INVENTION

In the following, suitable embodiments of the invention will be described, in detail with examples and with, reference to the drawings. Further, not being limited to the embodiments described, in the following, the invention can be variously modified, as long as having substantially the same structure as that of the invention and performing similar operational effects.

First Embodiment

Figure 1:
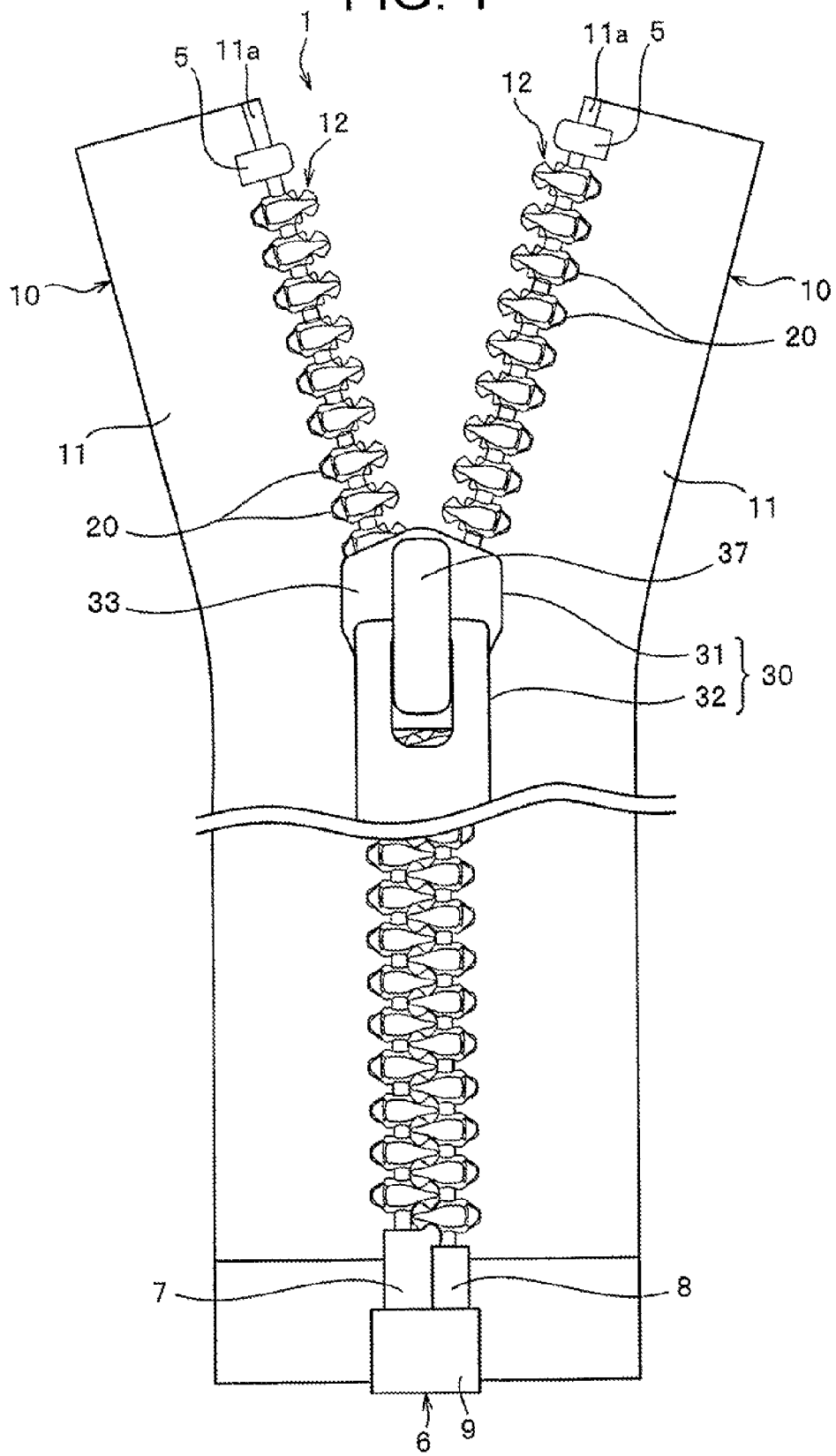
FIG. 1 is a plan view showing a slide fastener which has a fastener stringer according to a first embodiment of the invention.
Figure 2:
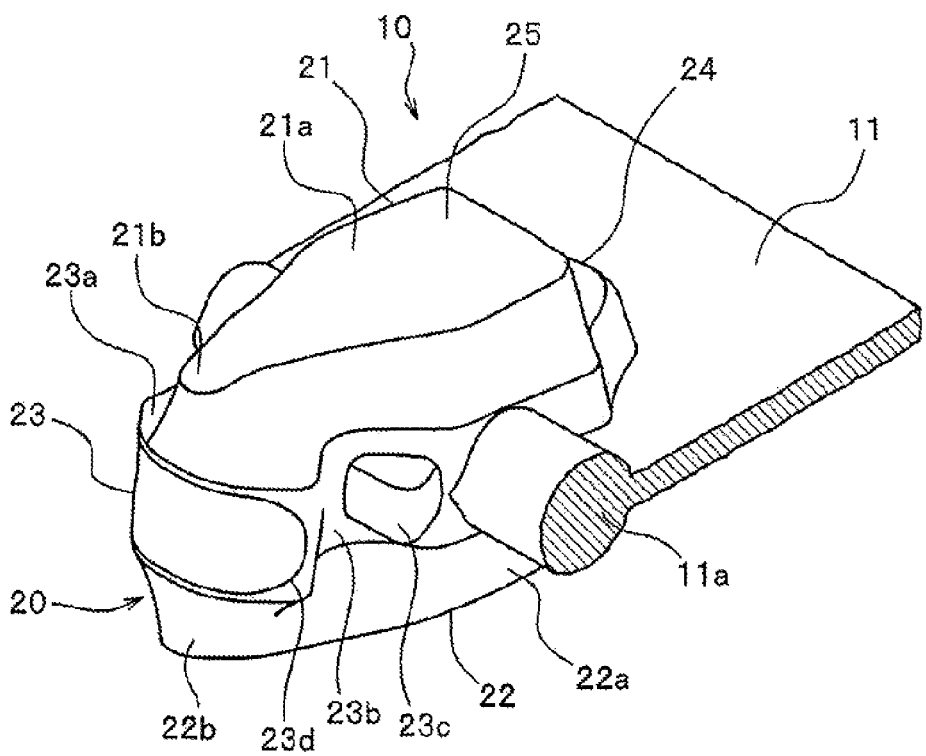
FIG. 2 is a perspective view showing an enlarged fastener element of the slide fastener.
Figure 3:
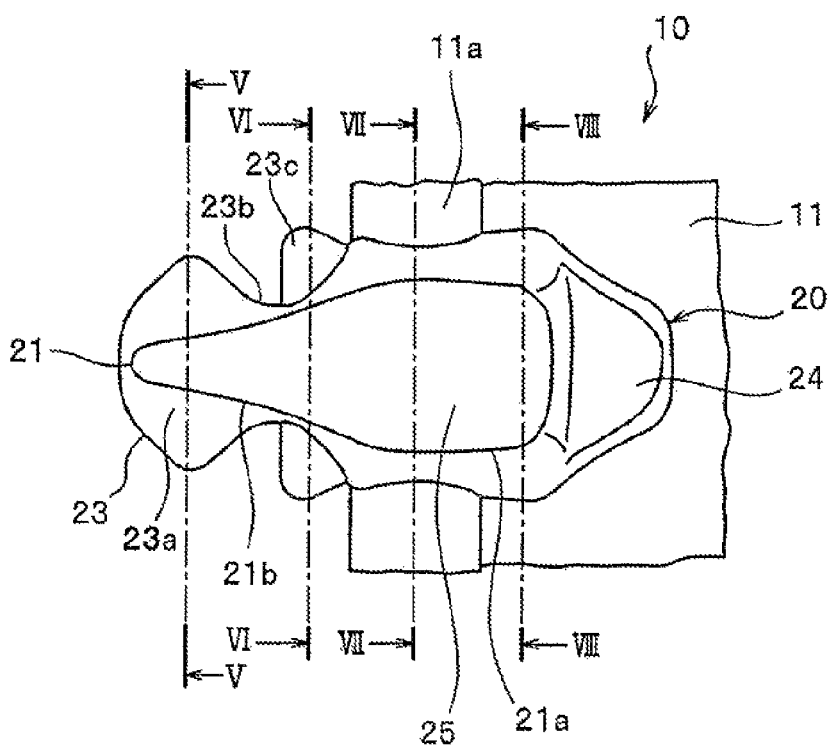
FIG. 3 is a plan view of the fastener element.
Figure 4:
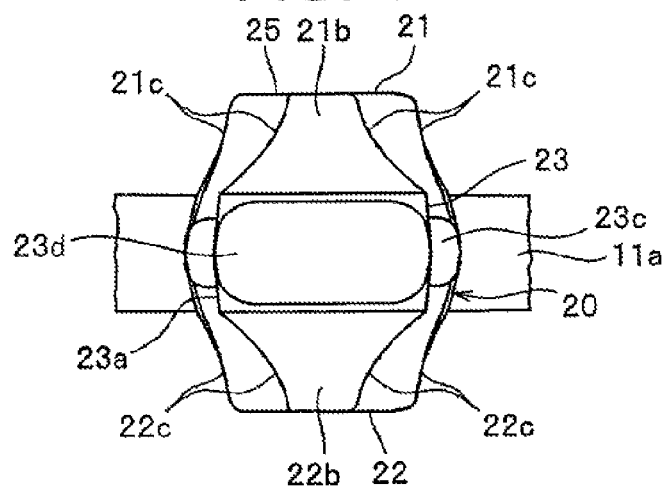
FIG. 4 is a schematic view of the fastener element when viewed from an extending section side and a coupling head section side.

FIG. 1 is a plan view showing a slide fastener which has a fastener stringer according to a first embodiment of the invention. FIGS. 2 and 3 are a perspective view and a plan view of a fastener element of the slide fastener. FIG. 4 is a schematic view of the fastener element when viewed from an extending section side and a coupling head section side.

Further, in the description below, a tape length direction of the fastener tape is stipulated as a front and back direction. In particular, a direction in which the slider is slid when closing the slide fastener is stipulated as front, and a direction in which the slider is slid when opening the slide fastener is stipulated as back. Further, a tape width direction of the fastener tape is stipulated as a left and right direction. In addition, a tape front and back direction of the fastener tape is stipulated as an upward and downward direction, and a side where a pull tab of the slider is disposed with respect to the fastener tape is stipulated as upward, and a side which is opposite to it is stipulated as downward.

In addition, regarding the fastener element, a tape length direction may be described as an element width direction, a tape width direction may be described as an element length direction, and a tape front and back direction may be described as an element height direction in order to explain characteristics of the invention clearly.

As shown in FIG. 1, a slide fastener 1 in the first embodiment includes a pair of fastener stringers 10 on which element rows 12 are formed along opposite tape side edge sections of left and right fastener tapes 11, first end stops 5 (also referred to as upper end stops) which are disposed adjacent to the element rows 12 at the upper end sections of the fastener stringers 10, a separable bottom end stop 6 which is disposed at the lower end sections of the pair of fastener stringers 10, and a slider 30 with a locking mechanism which is slidably disposed along the element rows 12.

Further, the slide fastener 1 according to the first embodiment has a main characteristic in each fastener element 20 composing the element rows 12, and the fastener tape 11, the first end stops 5, the separable bottom end stop 6, and the slider 30 are used for substantially the same as conventional ones. For example, the separable bottom end stop 6 of the first embodiment includes an insert pin 7 which is disposed at the back end section of the left side fastener stringer 10, a box pin 8 which is disposed at the back end section of the right side fastener stringer 10, and a box 9 which is integrally molded at the back end section of the box pin 8. The separable bottom end stop 6 is configured for right-side insertion.

Further, in the invention, for example, a positional relation between the insert pin 7 as well as the box pin 8 and the box 9 is inverted in the left and right direction with respect to the first embodiment, the insert pin 7 is attached to the right side fastener stringer 10, and the box pin 8 and the box 9 are attached to the left side fastener stringer 10, and thereby it is also possible to configure a separable bottom, end stop for left-side insertion.

Figure 10:
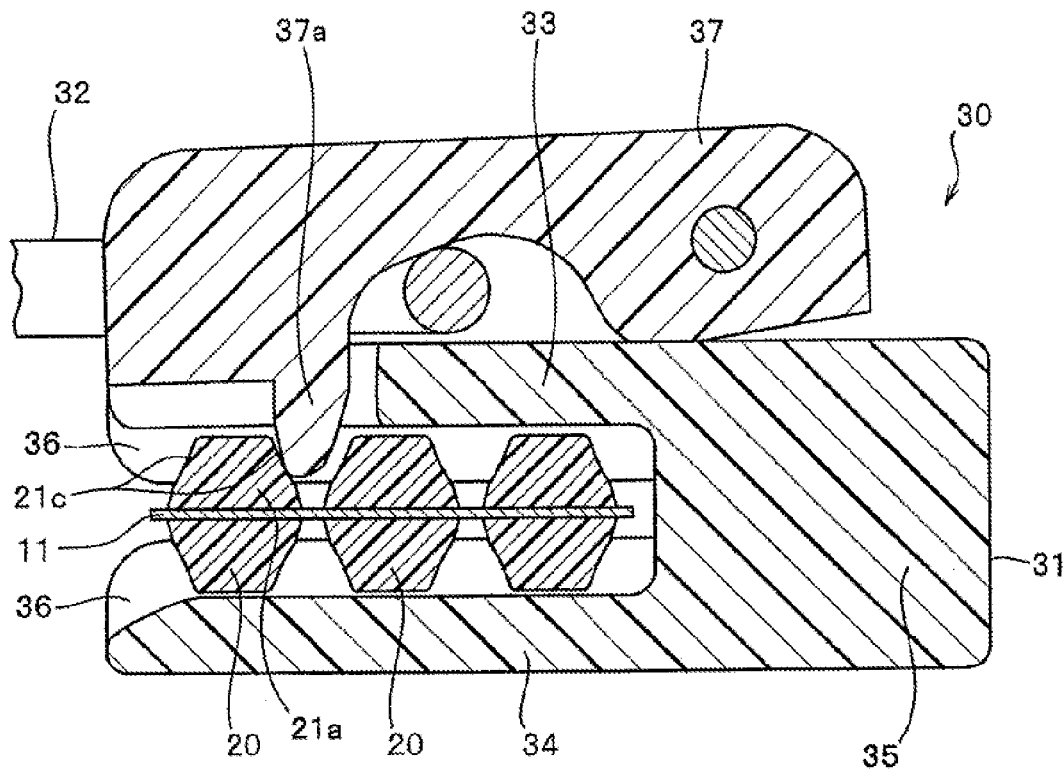
FIG. 10 is a sectional view showing a relation between a fastener element and a locking pawl of a slider.

Further, the slider 30 in the first embodiment has a locking mechanism and includes a slider body 31 and a pull tab 32 which is rotatably held by the slider body 31. As shown in FIG. 10, the slider body 31 includes upper and lower blades 33 and 34, a guide column 35 which connects between shoulder-side end sections of the upper and lower blades 33 and 34, flange sections 36 which are disposed on the left and right side edge sections of the upper and lower blades 33 and 34, a pull tab attachment column which is not illustrated and which is erected on an upper face side of the upper blade 33, a cover body 37 which is swingably attached to the pull tab attachment column, and an elastic member which is not illustrated and which energizes the cover body 37.

Further, the cover body 37 is integrally formed with a locking pawl 37a which works the locking mechanism. The locking pawl 37a is disposed so as to protrude in an element guide pass between the upper and lower blades 33 and 34, since the cover body 37 is energised by the unillustrated elastic member.

In each fastener stringer 10 in the first embodiment, the fastener tape 11 is woven or knitted in a belt shape. Each fastener tape 11 includes a tape main section sewn to fastener-attached products (such as clothing and bags), and a tape side edge section (also referred to as an element attaching section) along which an element row 12 is formed. Further, core thread sections 11a are disposed in tape side-edges in which the left and right fastener tapes 11 oppose each other. Each element row 12 is formed by attaching a plurality of fastener elements 20 made of synthetic resin at regular intervals in the tape length direction in a tape side edge section including the core thread sections 11a of the fastener tape 11.

Each fastener element 20 includes a first half section (upper half section) 21 disposed on a tape upper face (front surface) side, which becomes to be a first surface of the fastener tape 11, a second half section (lower half section) 22 disposed on a tape lower face (back face) side which becomes to be a second surface of the fastener tape 11, an element engaging section 23 disposed between the first and the second extending sections 21b and 22b which are described later, of the first, and the second half sections 21 and 22, and a fin section 24 extending from an end edge section toward a tape inside of tape inner side of the first and the second half sections 21 and 22.

In this case, the first half section 21 of the fastener element 20 is located on an exposed surface side which is exposed to the outside in the slide fastener 1. Further, the first half section 21 and the second half section 22 have a plane-symmetrical shape with respect to the fastener tape 11. Therefore, here, the first half section 21 is described in detail, so that the detailed description of the second half section 22 is omitted.

The first half section 21 includes at least an upper face (an element front, surface) 25 facing toward the outside, and a frontward side face (a first side face) and a backward side face (a second side face) intersecting with respect to the tape length direction. Here, the upper face 25 of the fastener element 20 is a surface which is furthest in the tape front and back direction from the upper face of the fastener tape 11.

Further, the first half section 21 includes a first fixing section 21a fixed to the fastener tape 11 and a first extending section 21b extending from the first fixing section 21a toward the outside of the tape. The first half section 21 has a tapered element shape in which the element width dimension is gradually decreased toward a tip end section of the first extending section 21b when the entire first, half section 21 is viewed from the upper face side.

In order that the first fixing section 21a ensures fixing strength with respect to the fastener tape 11, the element width dimension in the lower end section (an end section on the side which is in contact, with the fastener tape 11) of the first, fixing section 21a is formed to have a same size as, for example, the element width dimension in the lower end section of a conventional general fastener element made of synthetic resin.

Further, for example, in a case that fixing strength is sufficiently obtained with respect to the fastener tape 11, it is possible to set the element width dimension in the lower end section of the first fixing section 21a to be smaller than the conventional element width dimension, and also to be larger than the conventional element width dimension when necessary.

Further, the front side face and the back side face of the first fixing section 21a are formed in a curved shape and in an inclined shape, so that the element width dimension of the first fixing section 21a is gradually increased from the upper face 25 of the fastener element 20 toward the tape upper face of the fastener tape 11 (in other ward, gradually decreased from, the tape upper face of the fastener tape 11 toward the upper face 25 of the fastener element 20) in order to show the fastener element 20 to be thin as a whole by making the element width dimension on the upper face of the first fixing section 21a smaller than that in the lower end section of the first, fixing section 21a.

Figure 7:
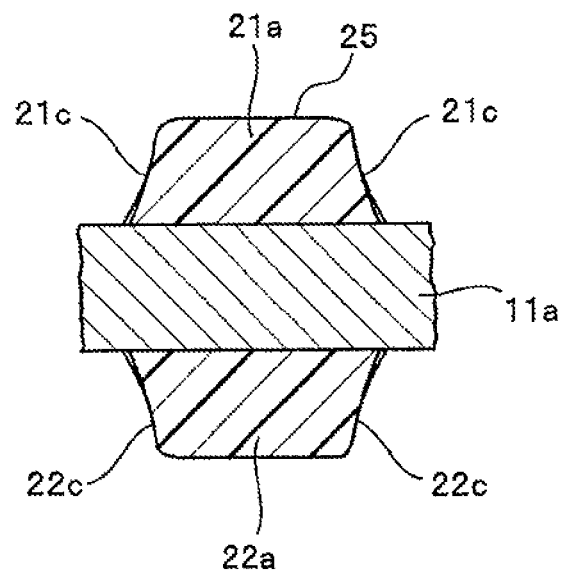
FIG. 7 is an arrow sectional view in VII-VII line which is shown in FIG. 3.
Figure 8:
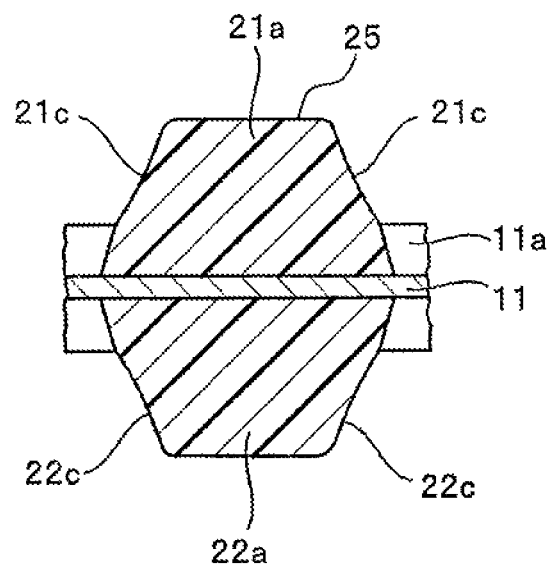
FIG. 8 is an arrow sectional view in VIII-VIII line which is shown in FIG. 3.

Particularly in this case, as shown in FIGS. 7 and 8, the front side face and the back side face of the first fixing section 21a have concave surfaces (concave curved surfaces) 21c which curves in a concave shape so as to recess inward of the fastener element 20 from the upper face 25 of the fastener element 20 toward the tape upper face of the fastener tape 11.

The first extending section 21b is formed in a shape in which the tip end section is tapered off in order to gradually decrease the element width dimension from a base end section toward a tip end section on the side connected to the first fixing section 21a. Also, the tip end section of the first extending section 21b is formed in a curved face shape in which a peripheral surface has roundness as it is chamfered. Thus, the appearance of the fastener element 20 is further closer to the metallic fastener element 20 when viewed from the upper face side. Additionally, a downward inclined surface is formed on the upper face 25 of the first extending section 21b such that a height dimension in the vertical direction of the fastener element 20 gradually decreases.

Further, as with the first fixing section 21a, the front side face and the back side face of the first extending section 21b are formed in a curved shape and in an inclined shape so that the element width dimension of the first extending section 21b is gradually increased from the element upper face 25 toward the tape upper face of the fastener tape 11 (in other wards, gradually decreased from the tape upper face of the fastener tape 11 toward the element upper face 25) in order to show the entire fastener element 20 to be thin by making the element width dimension on the element upper face 25 small.

Figure 5:
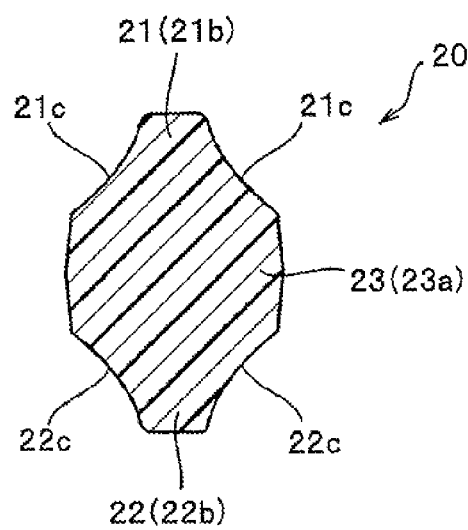
FIG. 5 is an arrow sectional view in V-V line which is shown in FIG. 3.
Figure 6:
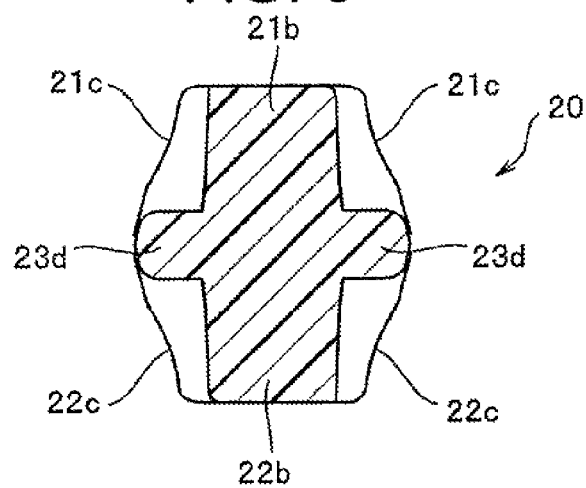
FIG. 6 is an arrow sectional view in VI-VI line which is shown in FIG. 3.

Additionally, as shown in FIG. 5, the front side face and the back side face of the first extending section 21b have concave surfaces (concave curved surfaces) 21c which curves in a concave shape so as to recess inward of the fastener element 20 from the element upper face 25 toward the tape upper face of the fastener tape 11.

In this case, it is preferable that a concave surface 21c which is disposed in the first fixing section 21a and a concave surface 21c which is disposed in the first extending section 21b be continuously formed. However, in the first embodiment, since a neck section 23b, which is described below, of the element engaging section 23 is formed to be thin in the element width direction, a concave curved surface, in which curvature is small, or a concave curved surface, which is close to a substantially plane surface, are disposed in a section of the first extending section 21b, which corresponds to a constricted position of the neck section 23b.

In this way, since the front side faces and the back, side faces of the first fixing section 21a and the first extending section 21b have concave surfaces 21c, when the fastener element 20 is viewed from the upper face side, the front side face and the back side face of the entire first half section 21 are difficult to recognise visually. Moreover, the direction in which light is reflected is changed by the concave surfaces 21c disposed on the front side face and the back side face, and the light is unlikely to be scattered toward the element upper side in the front side face and the back side face of the first half section 21. As a result, the front side face and the back side face of the first half section 21 appear darker than the upper face 25 of the first half section 21, like a shadow.

Accordingly, in the fastener element 20 in the first embodiment, the entire first half section 21 becomes narrow in the element width direction and becomes to appear to be thin (see FIG. 9), compared to conventional fastener elements as described in Patent Document 1.

Further, in such a way that the front side face and the back side face of the first fixing section 21a has a concave surface 21c, as described below, when the locking pawl 37a of the slider 30 is engaged with the first fixing section 21a of the fastener element 20 in order to use the locking mechanism of the slider 30, it is possible to securely receive the locking pawl 37a and to prevent the locking pawl 37a from disengaging on the concave surface 21c disposed at the front side face or the back side face of the first fixing section 21a. Accordingly, the locked state of the slider 30 can be held stably by the locking pawl 37a.

Further, the second half section 22 of the fastener element 20 in the first embodiment is integrally molded with the first half section 21 and the element engaging section 23, and has a plane-symmetrical shape to the first half section 21 with respect to the fastener tape 11 as described above.

That is, concave surfaces 22c which are formed so as to recess inward of the fastener element 20 in both the front side face and the back side face in the second fixing section 22a and second extending section 22b of the second half section 22. Therefore, in the fastener element 20 in the first embodiment, the entire second half section 22 becomes narrow in the element width direction and becomes to appear to be thin when the fastener element 20 is viewed from, the lower face side, so that it is possible to exhibit an appearance close to the metallic fastener element 20.

Further, since the first half section 21 and the second half section 22 of the fastener element 20 have plane-symmetrical shapes with respect to the fastener tape 11, it is possible to compose a slide fastener 1 in which the second half section 22 of the fastener element 20 becomes to be an exposed surface side which is exposed to the outside. Thereby, when a slide fastener for right-side insertion or a slide fastener for left-side insertion is manufactured, for example by altering a direction in which the slider 30 is attached or the like, the slide fastener 1 can be manufactured easily at a low cost by arbitrarily selecting right-side insertion or left-side insertion, without changing molding dies for the fastener element 20 and for the separable bottom end stop 6.

In the first embodiment, the element engaging section 23 of the fastener element 20 is disposed so as to be sandwiched between the first extending section 21b and the second extending section 22b. Further, this element engaging section 23 includes a coupling head section 23a which is capable of engaging the fastener element 20 of a counterpart, a neck section 23b which is continuously formed from the coupling head section 23a toward the fastener tape 11 side, and a pair of shoulder sections 23c which projects from the neck section 23b to the element width direction.

The coupling head section 23a of the element engaging section 23 is formed in an elliptical shape so as to project further in the element, width direction than the first and the second extending sections 21b and 22b. Further, a groove section 23d, into which the shoulder section 23c of the fastener element of a counterpart can be fitted, is formed along the tape length direction (the element width direction) at a tip end section of the coupling head section 23a.

The neck section 23b of the element, engaging section 23 has a constricted shape such that the dimension, in the element width direction decreases in order to enable the coupling head section 23a of the fastener element. 20 of an engaging counterpart, to be fitted. The shoulder section 23c is formed to have a shape and a size which is capable of fitting into the groove section 23d formed in the coupling head section 23a of a counterpart when the coupling head section 23a of the engaging counterpart is fitted on the neck section. 23b.

By the element engaging section 23 having such a shape, the left and right fastener elements 20 can be coupled or uncoupled smoothly when the slide fastener 1 is opened and closed by sliding the slider 30, and it is possible to stably obtain enough coupling strength to withstand the use of the slide fastener 1 when the left and right fastener elements 20 are coupled.

The fin sections 24 of the fastener element 20 are disposed on both the upper and lower tape surface sides of the fastener tape 11. The fin section 24 on the tape upper face side and the fin section 24 on the tape lower face side are formed so as to be symmetrical with respect to the fastener tape 11. The fin section 24 is formed in which the element width dimension from the base end section toward the extending end section (the end section of the tape inner side) on the side connected to the first fixing section 21 or the second half section 22, and has an approximately mountain shape when the fastener element 20 is viewed from its upper face side or lower face side.

The fixing strength of the fastener element 20 with respect to the fastener tape 11 can be increased by such fin sections 24 being disposed. Additionally, the fin sections 24 of the fastener element 20 are disposed so as to correspond to the positions where flange sections 36 of the slider 30 pass when the slider 30 is slid, so that it is possible to prevent the flange sections 36 of the slider 30 from contacting with the fastener tape 11 directly. Accordingly, when the slider 30 is slid, it is possible to prevent the fastener tape 11 from, being damaged by such as scratching or cutting, due to contact of the fastener tape 11 with the flange sections 36.

In the slide fastener 1 in the first embodiment, the fastener element 20, the first end stop 5, and the separable bottom end stop 6 are formed by injection-molding thermoplastic polyacetal resin. In this case, flat metal fine pieces made of aluminum or aluminum alloy are uniformly kneaded in polyacetal resin composing the fastener element 20, the first end stop 5, and the separable bottom end stop 6.

Further, in the invention, the kinds of synthetic resin composing the fastener element 20, the first stop 5, and the separable bottom end stop 6 is not limited to polyacetal resin as described above and, for example, other synthetic resins such as polyamide, polypropylene, polybutylene terephthalate, nylon, polycarbonate, and the like can also be used. A fastener element 20 composed using such synthetic resin is greatly lightened in weight compared to a metallic fastener element.

Further, polyacetal resin as described above has permeability, so that by selecting polyacetal resin as the material for the fastener element 20, the first stop 5, and the separable bottom end stop 6, a stable gloss by metal fine pieces can be obtained when the metal fine pieces are dispersed in synthetic resin.

In this case, the average particle diameter of the metal fine pieces kneaded in synthetic resin is controlled so as to be $\geq 3$ μm$\leq 8$ μm. By the average particle diameter of the metal fine pieces being $\geq 3$ μm$\leq 8$ μm, the gloss with high-grade sense can be obtained to an entire molded object, and the strength of the fastener elements 20, the first stop 5, and the separable bottom end stop 6 can be effectively improved.

Further, by the average particle diameter of the metal fine pieces being $\leq 8$ μm, it is possible to prevent the fastener elements 20, the first stop 5, and the separable bottom end stop 6 from glaring and to obtain the gloss with high-grade sense stably. Furthermore, if an average particle diameter of the metal fine pieces is $\leq 8$ μm, it is possible to prevent a decrease of strength of the molded object caused by mixing the metal fine pieces, since synthetic resins is not divided even in a case that a plurality of the metal fine pieces are kneaded in synthetic, resin.

Additionally, the thickness of flat metal fine piece is set to be $\geq 0.1$ μm$\leq 0.4$ μm. Accordingly, brightness and clarity of the fastener element 20, the first stop 5, and the separable bottom end stop 6 can foe improved, and flow of molten resin in a cavity can be stabilized when injection-molding, and generation of a weld mark which causes a fault, of molding can be prevented effectively.

Further, the content of the metal fine pieces kneaded in synthetic resin (the kneaded amount) is set to be $\geq 0.4$ wt. %$\leq 5.0$ wt. %. Thereby, the fastener element 20, the first stop 5, and the separable bottom end stop 6 can be composed to be light in weight and low in cost and generation of glare of the fastener element 20, the first stop 5, and the separable bottom end stop 6 can be prevented effectively.

In the slide fastener 1 in the first embodiment, as described above, concave surfaces 21c are disposed on the front side faces and the back side faces of the first and the second fixing sections 21a and 22a as well as of the first, and the second extending sections 21b and 22b in each fastener element 20. Thus, in a case that the slide fastener 1 is closed by coupling the left and right fastener elements 20 with each other, for example as shown in FIG. 9, the front side face and the back side face of the first half section 21 (or the second half section 22) are made less visible when the slide fastener 1 in a closed state is viewed from the tape upper face side (or the tape lower face side), and the front side face and the back side face of the first half section 21 appear to be dark like shadow, compared to the upper face 25 of the first half section 21 (or the lower face of the second half section 22).

Figure 9:
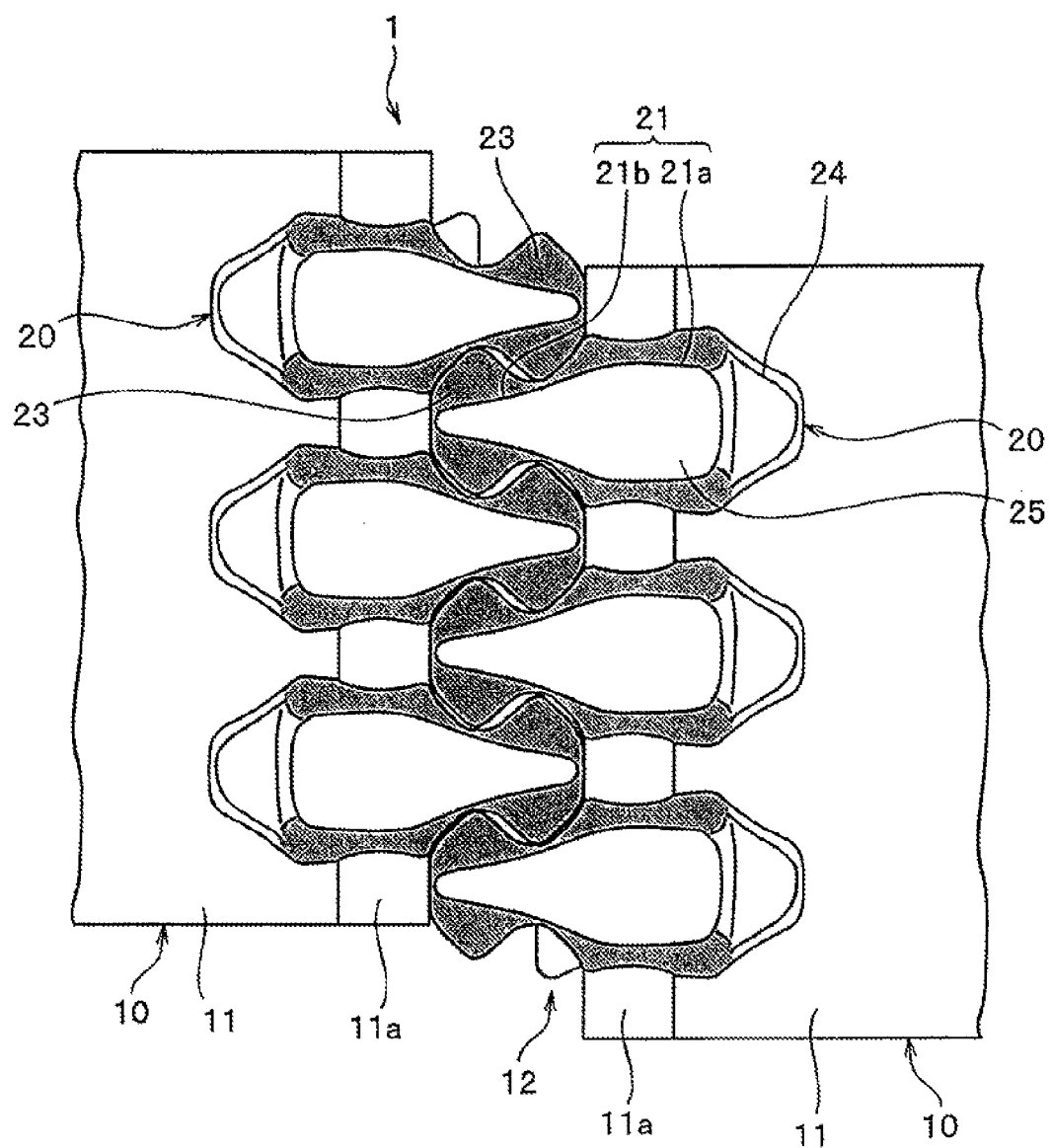
FIG. 9 is a plan view showing a coupled state of left and right fastener elements.

Accordingly, since the first half section 21 becomes narrow in the element width direction (the tape length direction) and the entire first half section 21 becomes to appear to be thin as shown in FIG. 9, the shape of fastener element 20 in the first embodiment has an appearance close to the metallic fastener element.

Additionally, since in the fastener element 20, metal fine pieces are dispersed in resin composing the fastener element 20, the gloss by the metal fine pieces is obtained stably. Particularly in this case, when the fastener element 20 is viewed from its upper face side, the contrast between the upper face 25 of the first half section 21 in which the gloss of the metal fine pieces is easily seen by reflection of light, and the front side face and the back side face in which reflection of light is difficult to see, is remarkably appeared, so that, it is possible to emphasize the thinness of the upper face 25 of the first half section 21.

Accordingly, since in the slide fastener 1 in the first embodiment, the appearance of the fastener element 20 can be made much closer to that of the metallic fastener element 20, the slide fastener in the first embodiment becomes to be lighter in weight and to be easier to use than a slide fastener to which conventional metallic fastener elements are attached, and becomes to be excellent in appearance quality and design by looking stylish or giving a fashionable impression.

Further, since in the slide fastener 1 in the first embodiment, concave surfaces 21*c* are disposed on the front side face and the back side face of the first fixing section 21*a* in each fastener element 20, as shown in FIG. 10, when the locking pawl 37*a* of the slider 30 is inserted into a gap between the fastener elements 20 and is engaged with the first fixing sections 21*a* of the fastener element 20, the locking pawl 37*a* of the slider 30 can be securely received and accommodated by the concave surfaces 21*c* formed on the front side face and the back side face of the first fixing section 21*a*.

Accordingly, for example even in a case that the locking pawl 37*a* is formed so as to be thick, the locking pawl 37*a* can be engaged with the fastener element 20 stably, and it is possible to prevent engagement of the locking pawl 37*a* from being easily released.

Therefore, even in a case that the slider 30 is subjected to some impact or the like when the locked state of the slider 30 is maintained by the locking pawl 37*a*, a situation that the locking pawl 37*a* is being slid and lifted up along the front side face or the back side face of the fastener element in the conventional manner is not occurred, and the locking pawl 37*a* can be kept engaged with the fixing sections of the fastener elements 20 securely, so that the locked state of the slider 30 can be stably maintained.

Second Embodiment

Figure 11:
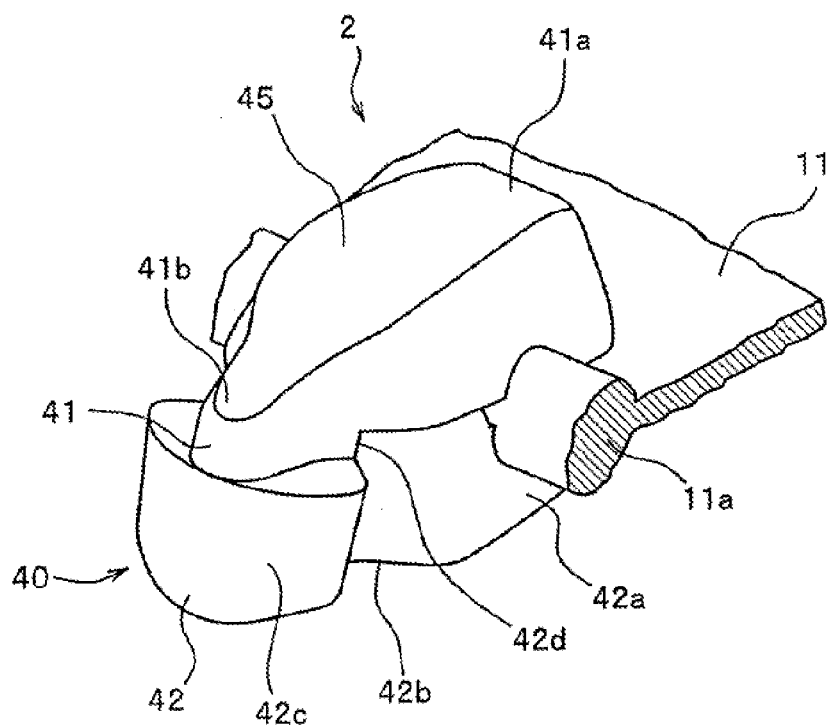
FIG. 11 is a perspective view showing a fastener element of a fastener stringer according to a second embodiment of the invention.
Figure 12:
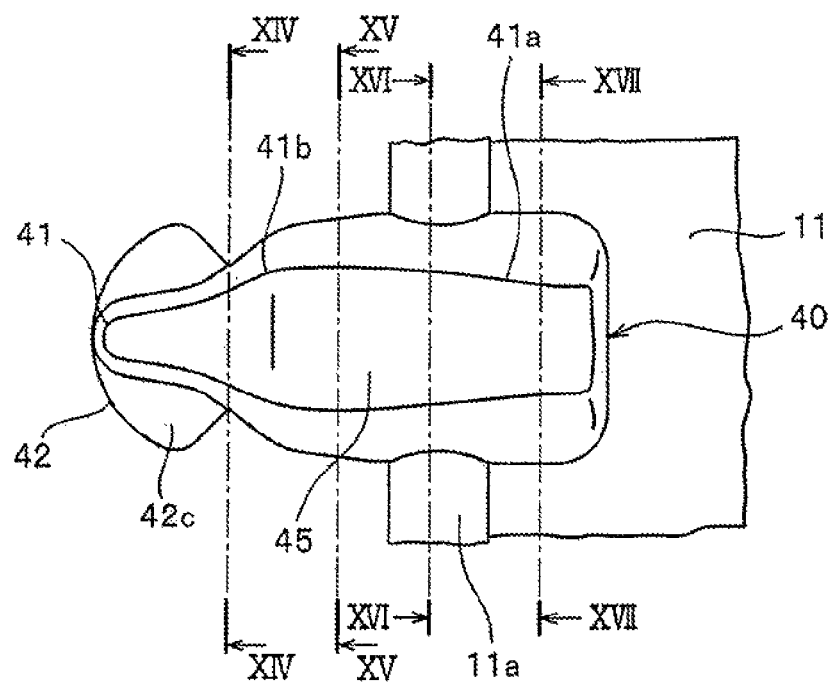
FIG. 12 is a plan view of the fastener element.
Figure 13:
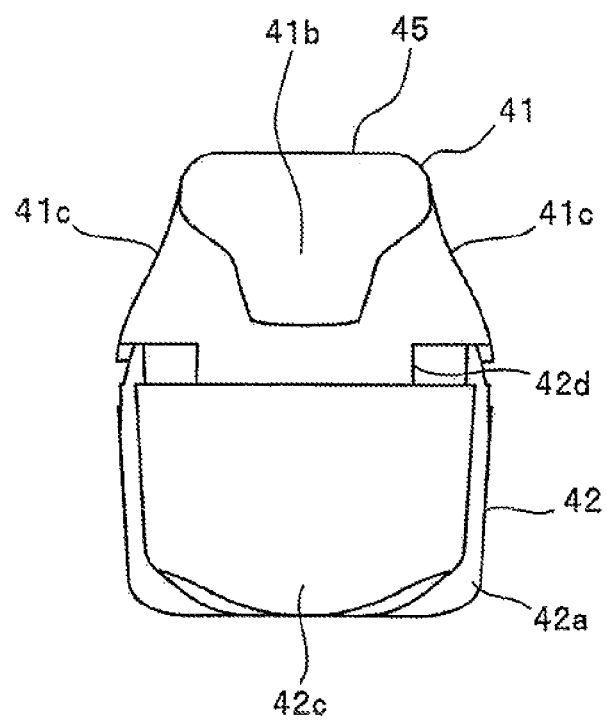
FIG. 13 is a schematic view of the fastener element when viewed from an extending section side and a coupling head section side.

FIG. 11 is a perspective view showing a fastener element of a fastener stringer according to the second embodiment. FIG. 12 is a plan view of the fastener element, and FIG. 13 is a schematic view of the fastener element when viewed from an extending section side and a coupling head section side.

Further, a slide fastener 2 according to the second embodiment described below has a main feature in a fastener element 40, and components or members other than the fastener element 40 have the substantially same configuration as the case of the slide fastener 1 according to the first embodiment described above. Therefore, the configuration of the fastener element 40 is mainly described in the second embodiment, and a detailed explanation of the components or members is omitted by using the same numerals as the case of the first embodiment.

The slide fastener 2 in the second embodiment includes a pair of fastener stringers 10 on which element rows are formed along an opposing tape side edge sections of the left, and right fastener tapes 11, first end stops which are not illustrated and which are disposed at the upper end section of each fastener stringer 10, a separable bottom end stop which is not illustrated and which is disposed at the lower end section of a pair of the fastener stringers 10, and a slider which is not illustrated and which has a locking mechanism disposed so as to be slidable along the element rows 12.

Each fastener element 40 composing the element rows includes a first half section (upper half section) 41 disposed on the tape upper face side, which is the first surface of the fastener tape 13, and a second half section (lower half section) 42 disposed on the tape lower face side, which is the second surface of the fastener tape 11. In this case, in the second embodiment, the first half section 41 of the fastener element 40 is located on an exposed surface side exposed to the outside in the slide fastener 2, and the first half section 41 and the second half section 42 have different shapes from each other.

The first half section 41 includes at least an upper face 45 facing toward the outside, and a front side face (first side face) and a back side face (second side face) intersecting with respect to the tape length direction. Additionally, this first half section 41 includes a fixing section 41*a* which is fixed to the fastener tape 11, and an extending section 41*b* which extends from the fixing section 41*a* to the outside of the tape. The first half section 41 has a tapered element shape in which an element width dimension is gradually decreased toward a tip end section of the extending section 41*b* when the entire first half section 41 is viewed from the upper face side.

As with the case of the first embodiment described above, in order that the fixing section 41*a* assure fixing strength with respect to the fastener tape 11, the element width dimension in the lower end section (the end section on the side contacted with the fastener tape 11) of the fixing section 41*a* is formed so as to be the same size as the element width dimension of the lower end section of a conventional general fastener element made of synthetic resin.

The front side face and the back side face of the fixing section 41*a* are formed in a curved shape or in an inclined shape so that the element width dimension of the first fixing section 41*a* is gradually increased from the upper face 45 of the fastener element 40 toward the tape upper face of the fastener tape 11, in order to show the fastener element 40 to be thin as a whole by making the element width dimension on the upper face 45 of the fixing section 41*a* smaller than that in the lower end section of the fixing section 41*a*.

Figure 16:
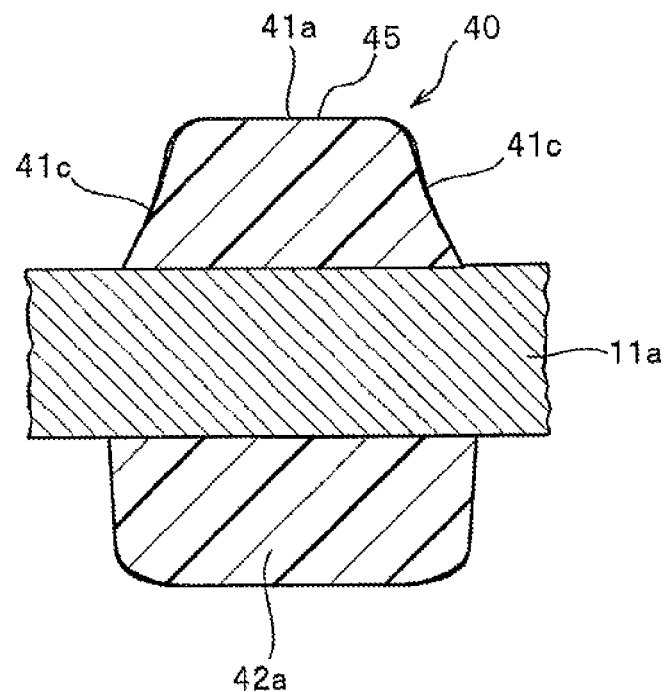
FIG. 16 is an arrow sectional view in XVI-XVI line which is shown in FIG. 12.
Figure 17:
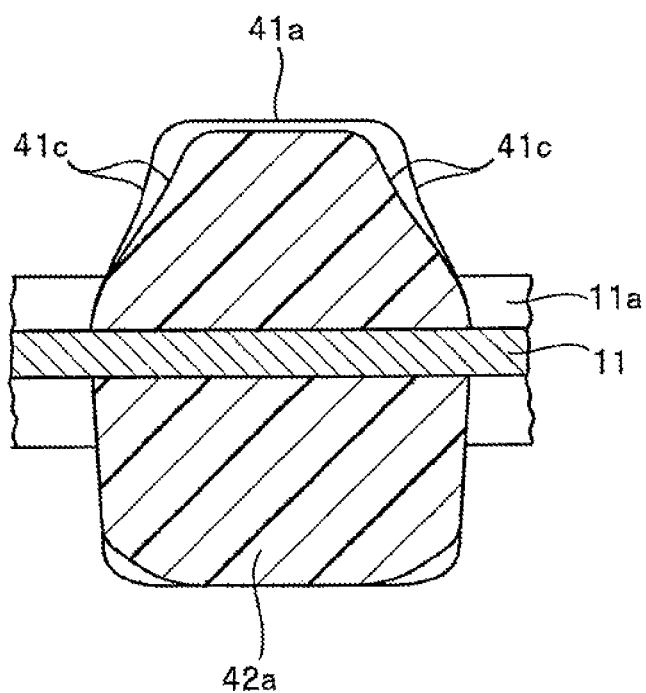
FIG. 17 is an arrow sectional view in XVII-XVII line which is shown in FIG. 12.
Figure 18:
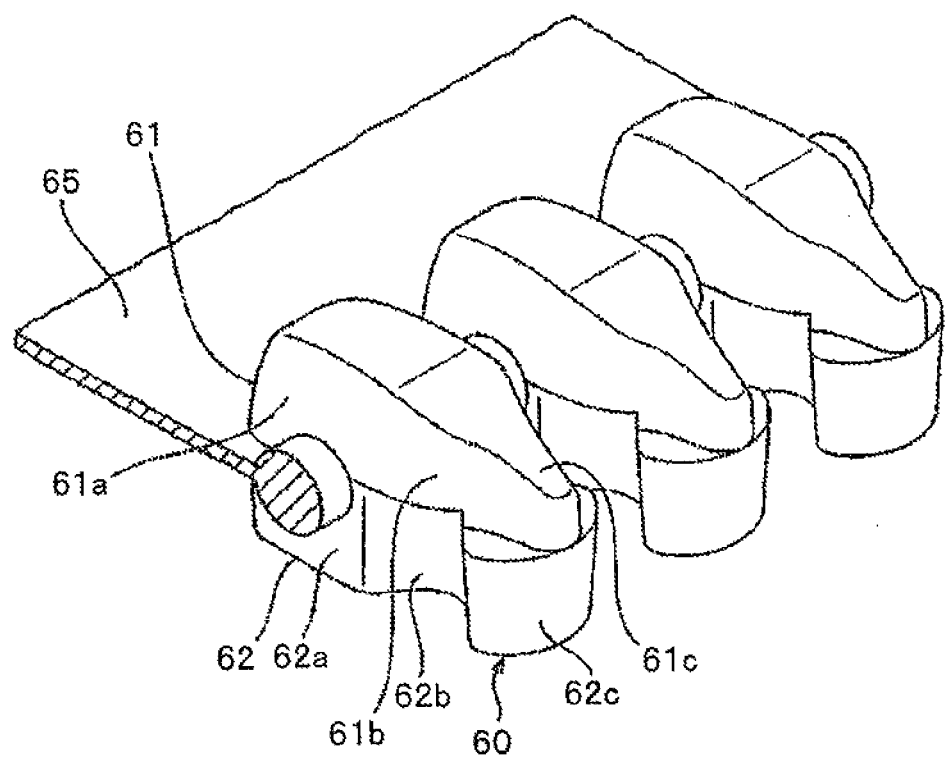
FIG. 18 is a perspective view showing a conventional fastener stringer.
Figure 19:
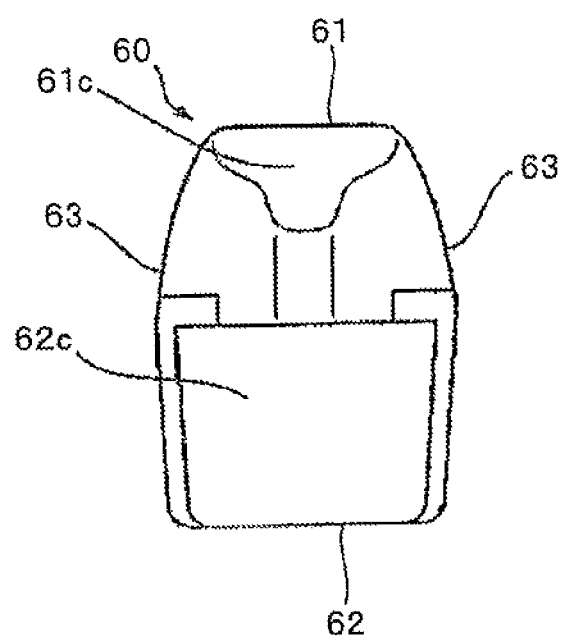
FIG. 19 is a schematic view of a fastener element of the fastener stringer when viewed from an extending section side and a coupling head section side.

Further, in this case, as shown in FIGS. 16 and 17, the front side face and the back side face of the fixing section 41*a* have concave surfaces (concave curved surfaces) 41*c*, which curves in a concave shape so as to recess inward of the fastener element 40 from the upper face 45 of the fastener element 40 toward, the tape upper face of the fastener tape 11.

The extending section 41*b* is formed in a form in which the tip end section is tapered off to gradually decrease the element width dimension from a base end section toward a tip end section on the side connected to the fixing section 41*a*. Also, the tip end section of the extending section 41*b* is formed in a curved surface shape in which a peripheral surface has roundness as it is chamfered. Additionally, a downward inclined surface is formed on the upper face of the extending section 41*b* such that a height dimension in the vertical direction of the fastener element 40 gradually decreases.

As with the fixing section 41*a*, the front side face and the back side face of this extending section 41*b* are formed in a curved shape or in a inclined shape so that the element width dimension of the first extending section 41*b* is gradually increased from the upper face 45 of the fastener element 40 toward the tape upper face of the fastener tape 11 in order to show the entire fastener element 40 to be thin by making the element width dimension on the upper face small.

Figure 14:
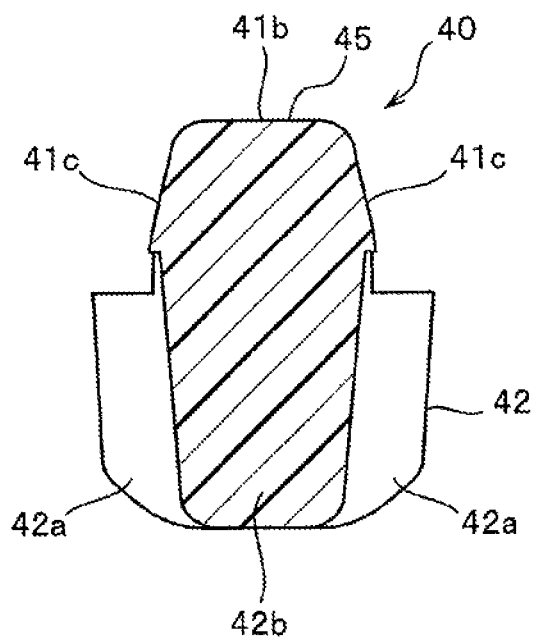
FIG. 14 is an arrow sectional view in XIV-XIV line which is shown in FIG. 12.
Figure 15:
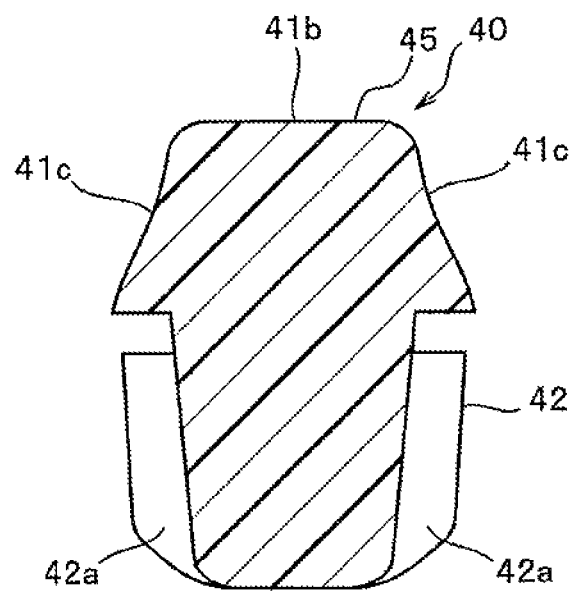
FIG. 15 is an arrow sectional view in XV-XV line which is shown in FIG. 12.

Further in this case, as shown in FIGS. 14 and 15, the front side face and the back side face of the extending section 41*b* has concave surfaces (concave curved surfaces) 41*c* which curves in a concave shape so as to recess inward of the fastener element 40 from the element upper face 45 toward the tape upper face.

In the second embodiment, a concave surface 41*c*, which is disposed on the front side face and the back side face of the fixing section 41*a*, and a concave surface 41*c*, which is disposed on the front side face and the back side face of the extending section 41*b*, are formed continuously over the entire first half section 41 from the end section on the tape inner side of the fixing section 41*a* toward the tip end section of the extending section 41*b*.

Since the concave surface 41*c* is formed on the front side face and the back side face over the entire first half section 41 as described above, the front side face and the back side face of the first half section 41 are difficult to be seen as a whole when the fastener element 40 is viewed from its upper face side. Furthermore, the front side face and the back side face became to be appear darker than the upper face 45 of the first half section 41. Accordingly, in the fastener element 40 in the second embodiment, the entire first half section 41 has an appearance to be narrow in the element width direction and to appear to be thin.

Further, since the front side face and the back side face of the first, fixing section 41*a* have concave surfaces 41*c*, as in the case of the slide fastener 1 according to the first embodiment, when the locking pawl of the slider is engaged with the fixing section 41*a* of the fastener element 40, the locking pawl can be securely received and accommodated by the concave surfaces 41*c* disposed on the front side face and the back side face of the fixing section 41*a*.

The second half section 42 of the fastener element 40 is integrally molded with the first half section 41. The second half section 42 includes a body section 42*a* which has a predetermined dimension in the tape length direction and which is fixed to the tape side edge section so as to sandwich the tape side edge section of the fastener tape 11 between the fixing section 41*a* of the first, half section 41, a neck section. 42*b* which is extended from the body section 42*a* toward the outside of the tape and which has a constricted shape in which the dimension in the element width direction decrease, and a coupling head section 42*c* which is further extended from the tip end section of the neck section 42*b* and which has an elliptical shape as it is swelled in the element width direction.

By the second half section 42 having such a shape, the left and right fastener elements 40 can be coupled or uncoupled smoothly when the slide fastener 2 is opened and closed by sliding the slider, and it is possible to stably obtain enough coupling strength to withstand the use of the slide fastener 2 when the left and right fastener elements 40 are coupled.

Furthermore, as shown in FIG. 11, in the fastener element 40 in the second embodiment, a step section 42*d* is provided so as to correspond to the position of the neck section 42*b* of the second half section 42 on the boundary section between the first half section 41 and second half section 42. The second half section 42 is configured by the step section 42*d* such that the height dimension of the element section from the step section 42*d* to the side of the fastener tape 11 is larger than that of the element section from the step section 42*d* to the side of the element tip end.

Since such a step section 42*d* is disposed, for example when the left and right fastener elements 40 are coupled by sliding the slider, for example even if a relative height, position of the left and right fastener elements 40 are displaced within an element guide path of the slider, displacement between the left and right-fastener elements 40 is absorbed at the step section 42*d* and one of the coupling head section 42*c* out of the left and right fastener elements 40 can stably be fitted into the neck section 42*b* of the other. Accordingly, the coupling operation of the left and right fastener elements 40 can be performed more smoothly.

As with the fastener element 20 in the first embodiment as described above, the fastener element 40 in the second embodiment is formed by injection molding thermoplastic polyacetal resin in which flat metal fine pieces made of aluminum or aluminum alloy are kneaded. Accordingly, each fastener element 40 can obtain the gloss with high-grade sense ever the entire element stably and it is also possible to improve the strength of the fastener element 40.

In a case that the slide fastener 2 of the second embodiment which has such a fastener element 40, is coupled with the left and right fastener elements 40 and is closed, the first half section 41 becomes narrow in the element width direction and the entire first half section 41 becomes to appear to be thin when the slide fastener 2 in a closed state is viewed from the upper face side. Furthermore, the contrast between the upper face 45 of the first half section 41 in which the gloss of the metal fine pieces is easily seen by reflection of light, and the front side face and the back side face in which reflection of light is difficult to see, is remarkably appeared. Accordingly, the fastener element 40 in the second embodiment can exhibit an appearance close to the metallic fastener element 40.

Additionally, in the slide fastener 2 in the second embodiment, since a concave surface 41*c* is disposed on the front side face and the back side face of the fixing section 41*a* in each fastener element 40, as with the slide fastener 1 according to the first embodiment described above, the locking pawl of the slider can be received and accommodated securely at the concave surface 41*c* disposed on the front side face and the back side face of the fixing section 41*a* when the locking mechanism of the slider is worked. Accordingly, it is possible to function the locking mechanism of the slider always stably.

REFERENCE SIGNS LIST

1 Slide fastener
2 Slide fastener
5 First end stop
6 Separable bottom end stop
7 Insert pin
8 Box pin
9 Box
10 Fastener stringer
11 Fastener tape
11*a* Core thread section
12 Element row
20 Fastener element 21 First half section
21a First fixing section
21b First extending section
21c Concave surface
22 Second half section
22a Second fixing section
22b Second extending section
22c Concave surface
23 Element engaging section
23a Coupling head section
23b Meek section
23c Shoulder section
23d Groove section
24 Fin section
25 Upper face
30 Slider
31 Slider body
32 Pull tab
33 Upper blade
34 Lower blade
35 Guide column
36 Flange section
37 Cover body
37a Locking pawl
40 Fastener element
41 First half section
41a Fixing section
41b Extending section
41c Concave surface
42 Second, half section
4 2a Body section
42b Neck section
42c Coupling head section
42d Step section
45 Upper face

The invention claimed is:

1. A fastener stringer including a fastener tape, and a plurality of fastener elements made of synthetic resin, which are attached to a tape side edge section of the fastener tape, in which
   the fastener elements include a first half section which is disposed on a first surface side of the fastener tape and a second half section which is disposed on a second surface side of the fastener tape, and in which
   at least one of the first and the second half sections has a tapered element shape comprising a fixing section fixed to the fastener tape and an extending section extending from the fixing section past the tape side edge of the tape and gradually decreasing in an element width dimension in a tape length direction toward a tip end section,
   wherein
      a width dimension from a first side face to a second side face in the tape length direction of the fixing section gradually increases from an element surface of the fastener element toward a tape surface of the fastener tape, and
      each of the first side face and the second side face in the fixing section has a curved concave surface, which curves inward so that the width dimension of the fixing section gradually increases between curves formed by the concave surfaces of the first side face and the second side face from the element surface toward a tape surface of the fastener tape.

2. The fastener stringer according to claim 1, wherein
   a width dimension from a first side face to a second side face in the tape length direction in the extending section gradually increases from the element surface of the fastener element toward the tape surface of the fastener tape, and
   each of the first side face and the second side face in the extending section has a concave face, which curves in a concave shape from the element surface toward the tape surface of the fastener tape.

3. The fastener stringer according to claim 2, wherein
   the concave surface is continuously disposed from the fixing section over the extending section which are in the tapered element shape.

4. The fastener stringer according to claim 1, wherein
   the other of the first and second half sections has the tapered element shape which has a plane-symmetrical relation with respect to the one of the first and second half sections as well as the fastener tape, and
   a coupling head section which is capable of coupling with the fastener element of a counterpart between each extending section of the first and the second half sections in the tape front and back direction, and a neck section, which is continuously formed from the coupling head section and which has a shape in which a dimension of an element width direction decreases, are disposed between the respective extending sections of the first and the second half sections in a tape front and back direction.

5. The fastener stringer according to claim 1, wherein the other of the first and the second half sections includes a coupling head section which is disposed on a back face side of the extending section in one of the first and the second half sections and which is able to couple with a fastener element of a counterpart, a neck section which is continuously formed from the coupling head section and which has a shape in which a dimension of an element width direction decreases, and a body section which is continuously formed from the neck section and which is fixed to the fastener tape.

6. The fastener stringer according to claim 1, wherein metal fine pieces made of aluminum or aluminum alloy are contained in the synthetic resin.

7. The fastener stringer according to claim 6, wherein an average particle diameter of the metal fine pieces is set to be $\geq 3$ μm$\leq 8$ μm.

* * * * *

UNITED STATES PATENT AND TRADEMARK OFFICE
CERTIFICATE OF CORRECTION

PATENT NO. : 9,462,854 B2
APPLICATION NO. : 14/349786
DATED : October 11, 2016
INVENTOR(S) : Masayoshi Kojima et al.

It is certified that error appears in the above-identified patent and that said Letters Patent is hereby corrected as shown below:

In the Specification

In column 1, line 34, delete "set-large" and insert -- set large --, therefor.

In column 1, line 43, delete "element," and insert -- element --, therefor.

In column 1, line 48, delete "disposed," and insert -- disposed --, therefor.

In column 1, line 50, delete "disposed," and insert -- disposed --, therefor.

In column 1, line 53, delete "avoided" and insert -- molded --, therefor.

In column 2, line 59, delete "weight," and insert -- weight --, therefor.

In column 3, line 26, delete "Parent" and insert -- Patent --, therefor.

In column 3, line 63, delete "6D" and insert -- 60 --, therefor.

In column 4, line 3, delete "hack" and insert -- back --, therefor.

In column 4, line 55, delete "fastener-tape" and insert -- fastener tape --, therefor.

In column 5, line 8, delete "element-surface" and insert -- element surface --, therefor.

In column 5, line 47, delete "find" and insert -- and --, therefor.

In column 5, line 51, delete "cape" and insert -- tape --, therefor.

In column 5, line 54, delete "(back," and insert -- (back --, therefor.

In column 7, line 4, delete "element," and insert -- element --, therefor.

In column 7, line 8, delete "from," and insert -- from --, therefor.

In column 7, line 21, delete "element," and insert -- element --, therefor.

In column 7, line 43, delete "back," and insert -- back --, therefor.

In column 8, line 9, delete "element," and insert -- element --, therefor.

In column 10, line 5, delete "bottom," and insert -- bottom --, therefor.

In column 10, line 60, delete "front," and insert -- front --, therefor.

In column 11, line 10, delete "contact," and insert -- contact --, therefor.

Signed and Sealed this
Twentieth Day of December, 2016

Michelle K. Lee
*Director of the United States Patent and Trademark Office*

CERTIFICATE OF CORRECTION (continued)
U.S. Pat. No. 9,462,854 B2

In the Specification

In column 11, line 11, delete "first," and insert -- first --, therefor.

In column 11, line 28, delete "from," and insert -- from --, therefor.

In column 11, line 33, delete "first," and insert -- first --, therefor.

In column 12, line 16, delete "back," and insert -- back --, therefor.

In column 12, line 58, delete "from," and insert -- from --, therefor.

In column 13, line 25, delete "element," and insert -- element --, therefor.

In column 13, line 26, delete "dimension," and insert -- dimension --, therefor.

In column 13, line 28, delete "element." and insert -- element --, therefor.

In column 13, line 29, delete "counterpart," and insert -- counterpart --, therefor.

In column 13, line 34, delete "section." and insert -- section --, therefor.

In column 13, line 62, delete "from," and insert -- from --, therefor.

In column 14, line 36, delete "synthetic," and insert -- synthetic --, therefor.

In column 14, line 40, delete "foe" and insert -- be --, therefor.

In column 14, line 42, delete "fault," and insert -- fault --, therefor.

In column 15, line 15, delete "that," and insert -- that --, therefor.

In column 15, line 67, delete "second," and insert -- second --, therefor.

In column 16, line 6, delete "left," and insert -- left --, therefor.

In column 16, line 17, delete "13," and insert -- 11, --, therefor.

In column 16, line 59, delete "toward," and insert -- toward --, therefor.

In column 17, line 33, delete "became" and insert -- become --, therefor.

In column 17, line 39, delete "first," and insert -- first --, therefor.

In column 17, line 52, delete "first," and insert -- first --, therefor.

In column 18, line 14, delete "right-fastener" and insert -- right fastener --, therefor.

In column 18, line 26, delete "ever" and insert -- over --, therefor.